United States Patent
Yang et al.

(10) Patent No.: US 12,540,092 B2
(45) Date of Patent: Feb. 3, 2026

(54) METHOD FOR CIRCULARLY PURIFYING METALLURGICAL ARSENIC-CONTAINING ACIDIC WASTE LIQUID AND RECOVERING SULFUR

(71) Applicant: NORTHEASTERN UNIVERSITY, Shenyang (CN)

(72) Inventors: Hongying Yang, Shenyang (CN); Yajing Chen, Shenyang (CN); Linlin Tong, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 516 days.

(21) Appl. No.: 18/131,399

(22) Filed: Apr. 6, 2023

(65) Prior Publication Data
US 2023/0331612 A1    Oct. 19, 2023

(30) Foreign Application Priority Data
Apr. 15, 2022 (CN) .......................... 202210394167.5

(51) Int. Cl.
*C02F 9/00* (2023.01)
*C01F 11/46* (2006.01)
(Continued)

(52) U.S. Cl.
CPC ............... *C02F 9/00* (2013.01); *C01F 11/46* (2013.01); *C02F 1/004* (2013.01);
(Continued)

(58) Field of Classification Search
None
See application file for complete search history.

(56) References Cited

FOREIGN PATENT DOCUMENTS

| CN | 101586185 A | 11/2009 |
|---|---|---|
| CN | 101805080 A | 8/2010 |

(Continued)

OTHER PUBLICATIONS

GB 18598-2019, Standard for pollution control on the hazardous waste landfill, China National Standards, 2019, pp. 1-17, Ministry of Ecology and Environment of the People's Republic of China; State Administration for Market Regulation.

*Primary Examiner* — Peter Keyworth
(74) *Attorney, Agent, or Firm* — Bayramoglu Law Offices LLC

(57) ABSTRACT

A method for circularly purifying metallurgical arsenic-containing acidic waste liquid and recovering sulfur, including the following steps: (1) adding a calcium-free arsenic removal agent into the metallurgical arsenic-containing acidic waste liquid for stirring reaction, and filtering the reaction mixture to obtain arsenic-containing slag and a purified liquid; (2) adding calcium hydroxide into the purified liquid for secondary stirring reaction, and performing sedimentation and separation on the mixture to obtain a supernatant and a subjacent concentrated slurry; and refluxing the supernatant to a pretreatment workshop; (3) introducing the subjacent concentrated slurry into the metallurgical arsenic-containing acidic waste liquid, performing stirring reaction, and filtering the reaction mixture to obtain a liquid phase and a slag phase; and (4) washing the slag phase with water to obtain a gypsum product; refluxing the washing liquid to the pretreatment workshop; and taking the liquid phase as a raw material for purifying for removing arsenic.

7 Claims, 1 Drawing Sheet

(51) Int. Cl.
  *C02F 1/00* (2023.01)
  *C02F 1/52* (2023.01)
  *C02F 1/66* (2023.01)
  *C02F 101/10* (2006.01)
  *C02F 103/16* (2006.01)

(52) U.S. Cl.
  CPC ...... *C02F 2001/007* (2013.01); *C02F 1/5236* (2013.01); *C02F 1/66* (2013.01); *C02F 2101/103* (2013.01); *C02F 2103/16* (2013.01); *C02F 2301/08* (2013.01)

(56) References Cited

FOREIGN PATENT DOCUMENTS

| | | |
|---|---|---|
| CN | 106521162 A | 3/2017 |
| CN | 107840480 A | 3/2018 |
| GB | 169758 A | 10/1921 |
| JP | 2006328498 A | 12/2006 |

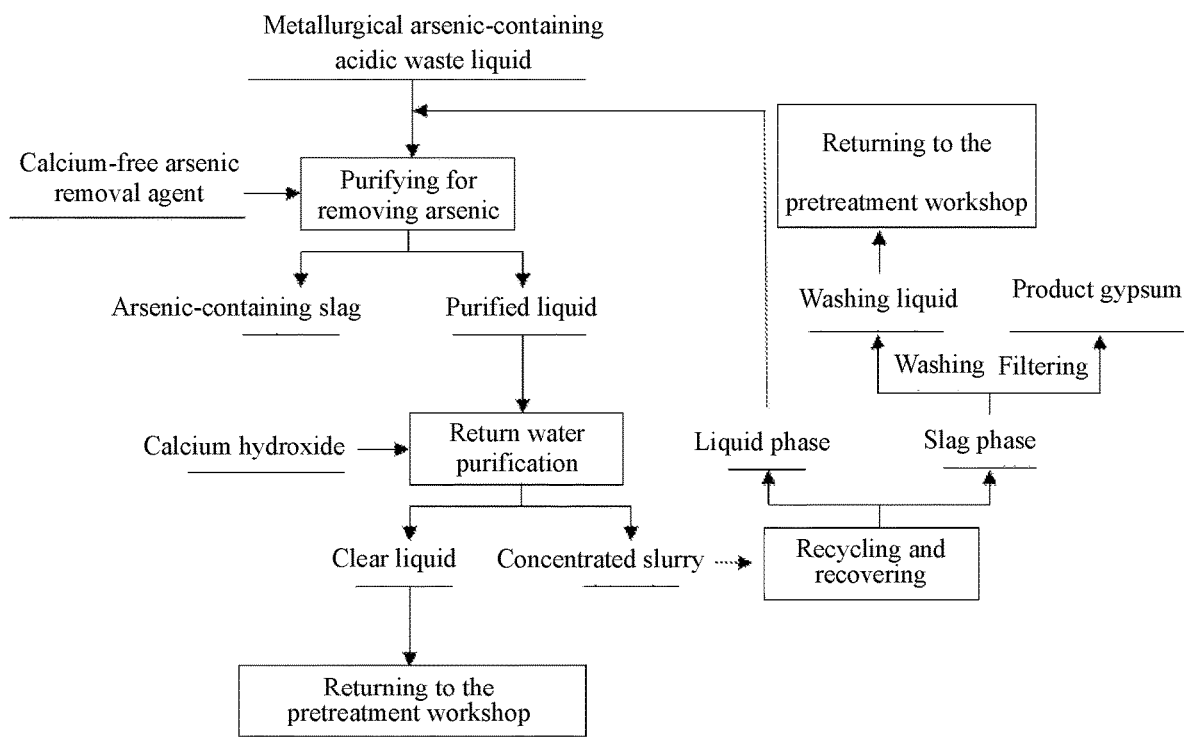

METHOD FOR CIRCULARLY PURIFYING METALLURGICAL ARSENIC-CONTAINING ACIDIC WASTE LIQUID AND RECOVERING SULFUR

CROSS REFERENCE TO THE RELATED APPLICATIONS

This application is based upon and claims priority to Chinese Patent Application No. 202210394167.5, filed on Apr. 15, 2022, the entire contents of which are incorporated herein by reference.

TECHNICAL FIELD

The present invention belongs to the technical field of water pollution treatment and resource recovery, and in particular relates to a method for circularly purifying metallurgical arsenic-containing acidic waste liquid and recovering sulfur.

BACKGROUND

In the metallurgical industry, in order to improve the gold extraction efficiency of arsenic-containing refractory gold concentrate, it is often required to perform an oxidation pretreatment process (a pressurized oxidation method, a biological oxidation method and the like). During this process, the arsenic in the ores is converted into arsenate ions, and the sulfur is converted into sulfuric acid, thereby producing a large amount of arsenic-containing acidic waste liquid, which will seriously endanger human health when it flows into the environment, and therefore, arsenic-containing wastewater must be treated before being discharged.

Enterprises usually adopt a neutralization-arsenic-iron co-precipitation method to perform arsenic fixation and iron removal on metallurgical arsenic-containing acidic waste liquid, and the most commonly used neutralizing agent is lime, wherein acid in the oxidation liquid is neutralized by lime to form calcium sulfate, and ferric salt in the waste liquid converts arsenic into insoluble ferric arsenate precipitate, which solves environmental pollution caused by arsenic, however, a large amount of arsenic-containing calcium sulfate slag is produced, which needs a huge site for stacking; and in addition, the stacking site also needs to be subjected to anti-seepage treatment, otherwise, the arsenic-containing calcium sulfate slag will bring different degrees of pollution to the surrounding environment. Moreover, the above method also causes the waste of sulfur element in a large amount of metallurgical arsenic-containing acidic waste liquid.

Chinese Patent Application No. CN101586185A discloses a method for separating and recovering arsenic and iron from sulfide ore biological oxidation pretreatment liquid, although this method converts arsenic into sodium arsenate and recovers it as a product, the arsenic-containing liquid is enriched to 40-60 g/L during the separation process, which is extremely dangerous. Moreover, products containing arsenic do not generate good market value.

Chinese Patent Application No. CN106521162A discloses a method for recovering valuable elements from acidic arsenic, iron and sulfur-containing biological oxidation pretreatment liquid, wherein arsenic, iron and sulfur in the biological oxidation liquid are recovered step by step, so that the purpose of neutralizing and recovering the valuable elements in the bio-leaching liquid is achieved, and zero discharge of waste is achieved; and however, this process cannot adopt the existing purification process of the enterprises, resulting in relatively large cost of investment and construction.

Therefore, the development of a method with simple operation, low cost, less investment cost and high economic benefit is a technical problem to be solved urgently in the art.

SUMMARY

Aiming at the technical problems existing in the background, the present invention provides a method for circularly purifying metallurgical arsenic-containing acidic waste liquid and recovering sulfur.

The method of the present invention comprises the following steps:

(1) purifying for removing arsenic: taking the metallurgical arsenic-containing acidic waste liquid as a raw material; adding a calcium-free arsenic removal agent into the raw material for stirring reaction, and then filtering the reaction mixture to obtain arsenic-containing slag and a purified liquid;

(2) return water purification: adding calcium hydroxide into the purified liquid for secondary stirring reaction, and then performing sedimentation and separation on the mixture to obtain a supernatant and a subjacent concentrated slurry; and refluxing the supernatant to a pretreatment workshop;

(3) recycling and recovering: taking the subjacent concentrated slurry as a pH value adjuster, introducing the subjacent concentrated slurry into the metallurgical arsenic-containing acidic waste liquid until a pH value of all materials is 1.5-1.8, performing stirring reaction for at least 30 min, and then filtering the reaction mixture to obtain a liquid phase and a slag phase; and (4) washing the slag phase with water, and taking the washed secondary slag phase as a gypsum product; refluxing the washing liquid obtained by the washing to the pretreatment workshop; and taking the liquid phase as a raw material for purifying for removing arsenic.

In the step (1), the metallurgical arsenic-containing acidic waste liquid is obtained by performing oxidation pretreatment on arsenic-containing refractory gold concentrate.

In the step (1), in the metallurgical arsenic-containing acidic waste liquid, arsenic has a concentration of 1.5-8.5 g/L, iron has a concentration of 20-35 g/L, sulfate radical has a concentration of 100-140 g/L, a molar ratio of iron to arsenic is greater than 3, and a pH value is less than 1.5.

In the step (1), the calcium-free arsenic removal agent is a mixture of an additive and water, and the additive is one or more of oxides, hydroxides or carbonates of potassium, zinc, iron or magnesium; and the additive accounts for 10-15% of the mass of the calcium-free arsenic removal agent.

In the step (1), the addition amount of the calcium-free arsenic removal agent is based on a pH value of all materials after the addition of 4-5.

In the step (1), the stirring reaction is performed at a stirring speed of 400-600 rpm for 50-60 min.

In the step (1), the arsenic-containing slag complies with Standard for Pollution Control on the Hazardous Waste Landfill (GB 18598-2019).

In the step (1), the purified liquid is a sulfur-rich liquid, in which sulfate ions have a concentration of 70-90 g/L, and arsenic and iron are not detected.

In the step (2), the calcium hydroxide is prepared by mixing CaO and water according to a solid-liquid ratio of 1:(2.5-3) g/L; and the addition amount of the calcium hydroxide is based on a pH value of all materials after mixing of 8-10.5.

In the step (2), the secondary stirring reaction is performed at a temperature of 30±2° C. for at least 90 min.

In the step (2), the supernatant is a low-sulfur liquid, in which the sulfate radical has a content of 1.0-2.0 g/L.

In the step (2), the subjacent concentrated slurry is gypsum and hydroxide of metal ions in the calcium-free arsenic removal agent.

In the step (3), the liquid phase is a solution obtained by dissolving the hydroxide of the metal ion in the calcium-free arsenic removal agent in the subjacent concentrated slurry in the metallurgical arsenic-containing acidic waste liquid.

In the step (3), the mass contents of arsenic and iron in the slag phase are both less than or equal to 0.1%.

In the step (4), the washing is performed until the washing liquid is neutral.

The purposes of adding the calcium hydroxide for secondary stirring in the present invention for digestion are to save the reaction time and save the lime consumption; if the purity of the used quick lime is not high, the purpose of removing impurities can be achieved through the digestion.

Compared with the prior art, the present invention has the advantages: the existing method for treating metallurgical arsenic-containing acidic waste liquid is improved, a simple treatment process capable of generating economic benefits is provided, and the recycling of the calcium-free arsenic removal agent is achieved through interaction of different wastes, so that the cost of purifying for removing arsenic is reduced; and meanwhile, a gypsum product is produced, which brings certain economic benefits, so that the purpose of recovering sulfur in the metallurgical arsenic-containing acidic waste liquid is achieved. In addition, the present invention has simple process operation, less investment cost, high benefit and wide industrial applicability, and can solve the problem of environmental pollution caused by the pretreatment process in the metallurgical industry.

BRIEF DESCRIPTION OF THE DRAWING

The figure is a schematic flow chart of a method for circularly purifying metallurgical arsenic-containing acidic waste liquid and recovering sulfur according to the present invention.

DETAILED DESCRIPTION OF THE EMBODIMENTS

The detailed description of the present invention is further described in detail with reference to the following specific examples. It should be noted that the following examples are provided to illustrate the present invention, but are not intended to limit the scope of the present invention.

The pretreatment workshop of the present invention is a workshop for performing oxidation pretreatment on arsenic-containing refractory gold ores, that is, a workshop for producing metallurgical arsenic-containing acidic waste liquid; and the washing liquid and the supernatant are used as return water to prepare a leaching agent, or the arsenic-containing refractory gold ore is mixed into ore pulp.

The calcium hydroxide in the examples of the present invention is prepared by mixing quick lime and water according to the mass ratio of 1:2.5.

The arsenic-containing slag in the examples of the present invention complies with Standard for Pollution Control on the Hazardous Waste Landfill (GB 18598-2019).

The purified liquid in the examples of the present invention is a sulfur-rich liquid, in which sulfate ions have a concentration of 70-90 g/L, and arsenic and iron are not detected.

The supernatant in the examples of the present invention is a low-sulfur liquid, in which the sulfate radical has a content of 1.0-2.0 g/L.

The subjacent concentrated slurry in the examples of the present invention is gypsum and hydroxide of metal ions in the calcium-free arsenic removal agent.

The liquid phase obtained in the step (3) of the present invention is a solution obtained by dissolving the hydroxide of the metal ion in the calcium-free arsenic removal agent in the subjacent concentrated slurry in the metallurgical arsenic-containing acidic waste liquid.

The mass contents of arsenic and iron in the slag phase obtained in the step (3) of the present invention are both less than or equal to 0.1%.

Example 1

The process is shown in the figure:

adopting the metallurgical arsenic-containing acidic waste liquid produced in a pretreatment workshop, wherein arsenic has a concentration of 6.28 g/L, iron has a concentration of 22.3 g/L, sulfate radical has a concentration of 131.4 g/L, a molar ratio of iron to arsenic is greater than 4.75, and a pH value is 1.4;

taking the metallurgical arsenic-containing acidic waste liquid as a raw material; adding a calcium-free arsenic removal agent into the raw materials for stirring reaction, and then filtering the reaction mixture to obtain arsenic-containing slag and a purified liquid; wherein the calcium-free arsenic removal agent is a mixture (slurry) of an additive and water, and the additive is magnesium hydroxide; the additive accounts for 10% of the mass of the calcium-free arsenic removal agent; the addition amount of the calcium-free arsenic removal agent is based on a pH value of all materials after the addition of 4.9; and the stirring reaction is performed at a stirring speed of 400 rpm for 60 min;

adding calcium hydroxide into the purified liquid for secondary stirring reaction, and then performing sedimentation and separation on the mixture to obtain a supernatant and a subjacent concentrated slurry; and refluxing the supernatant to a pretreatment workshop; wherein the addition amount of the calcium hydroxide is based on a pH value of all materials after mixing of 10.5; and the secondary stirring reaction is performed at a temperature of 30±2° C. for 90 min;

taking the subjacent concentrated slurry as a pH value adjuster, introducing the subjacent concentrated slurry into the metallurgical arsenic-containing acidic waste liquid until a pH value of all materials is 1.8, performing stirring reaction for 30 min, and then filtering the reaction mixture to obtain a liquid phase and a slag phase; and washing the slag phase with water until the washing liquid is neutral, and taking the washed secondary slag phase as a gypsum product; refluxing the washing liquid obtained by the washing to the pretreatment workshop; and taking the liquid phase as a raw material for purifying for removing arsenic.

Example 2

The process is the same as that of Example 1, except that:
(1) in the metallurgical arsenic-containing acidic waste liquid, arsenic has a concentration of 2.03 g/L, iron has a concentration of 32.2 g/L, sulfate radical has a concentration of 111.4 g/L, a molar ratio of iron to arsenic is greater than 21.24, and a pH value is 1.0;
(2) the calcium-free arsenic removal agent is a mixture (slurry) of an additive and water, and the additive is zinc hydroxide; the additive accounts for 12% of the mass of the calcium-free arsenic removal agent; the addition amount of the calcium-free arsenic removal agent is based on a pH value of all materials after the addition of 4.4; and the stirring reaction is performed at a stirring speed of 500 rpm for 55 min;
(3) the addition amount of the calcium hydroxide is based on a pH value of all materials after mixing of 8.5; and the secondary stirring reaction is performed at a temperature of 30±2° C. for 100 min; and
(4) the subjacent concentrated slurry is taken as a pH value adjuster and introduced into the metallurgical arsenic-containing acidic waste liquid until a pH value of all materials is 1.6, and filtration is performed after stirring reaction for 35 min.

Example 3

The process is the same as that of Example 1, except that:
(1) in the metallurgical arsenic-containing acidic waste liquid, arsenic has a concentration of 8.21 g/L, iron has a concentration of 24.5 g/L, sulfate radical has a concentration of 131.1 g/L, a molar ratio of iron to arsenic is greater than 3.99, and a pH value is 0.84;
(2) the calcium-free arsenic removal agent is a mixture (emulsion) of an additive and water, and the additive is magnesium carbonate; the additive accounts for 15% of the mass of the calcium-free arsenic removal agent; the addition amount of the calcium-free arsenic removal agent is based on a pH value of all materials after the addition of 4; and the stirring reaction is performed at a stirring speed of 600 rpm for 50 min;
(3) the addition amount of the calcium hydroxide is based on a pH value of all materials after mixing of 10; and the secondary stirring reaction is performed at a temperature of 30±2° C. for 110 min; and
(4) the subjacent concentrated slurry is taken as a pH value adjuster and introduced into the metallurgical arsenic-containing acidic waste liquid until a pH value of all materials is 1.5, and filtration is performed after stirring reaction for 40 min.

Example 4

The process is the same as that of Example 1, except that:
(1) in the metallurgical arsenic-containing acidic waste liquid, arsenic has a concentration of 8.21 g/L, iron has a concentration of 24.5 g/L, sulfate radical has a concentration of 131.1 g/L, a molar ratio of iron to arsenic is greater than 3.99, and a pH value is 0.84;
(2) the calcium-free arsenic removal agent is a mixture (slurry) of an additive and water, and the additive is a mixture of potassium hydroxide, ferric oxide and magnesium carbonate in equal mass; the additive accounts for 15% of the mass of the calcium-free arsenic removal agent; the addition amount of the calcium-free arsenic removal agent is based on a pH value of all materials after the addition of 5; and the stirring reaction is performed at a stirring speed of 600 rpm for 50 min;
(3) the addition amount of the calcium hydroxide is based on a pH value of all materials after mixing of 10.5; and the secondary stirring reaction is performed at a temperature of 30±2° C. for 120 min; and
(4) the subjacent concentrated slurry is taken as a pH value adjuster and introduced into the metallurgical arsenic-containing acidic waste liquid until a pH value of all materials is 1.5, and filtration is performed after stirring reaction for 35 min.

Example 5

The process is the same as that of Example 1, except that:
(1) the additive accounts for 11% of the mass of the calcium-free arsenic removal agent; the additive is a mixture of magnesium hydroxide, magnesium oxide and magnesium carbonate in equal mass; the addition amount of the calcium-free arsenic removal agent is based on a pH value of all materials after the addition of 4.2; and the stirring reaction is performed at a stirring speed of 500 rpm for 55 min;
(2) the addition amount of the calcium hydroxide is based on a pH value of all materials after mixing of 9; and the secondary stirring reaction is performed at a temperature of 30±2° C. for 130 min; and
(3) the subjacent concentrated slurry is taken as a pH value adjuster and introduced into the metallurgical arsenic-containing acidic waste liquid until a pH value of all materials is 1.6, and filtration is performed after stirring reaction for 40 min.

Example 6

The process is the same as that of Example 1, except that:
(1) the additive accounts for 12% of the mass of the calcium-free arsenic removal agent; the addition amount of the calcium-free arsenic removal agent is based on a pH value of all materials after the addition of 4.4; and the stirring reaction is performed at a stirring speed of 500 rpm for 55 min;
(2) the addition amount of the calcium hydroxide is based on a pH value of all materials after mixing of 8; and the secondary stirring reaction is performed at a temperature of 30±2° C. for 140 min; and
(3) the subjacent concentrated slurry is taken as a pH value adjuster and introduced into the metallurgical arsenic-containing acidic waste liquid until a pH value of all materials is 1.5-1.8, and filtration is performed after stirring reaction for 40 min.

Example 7

The process is the same as that of Example 1, except that:
(1) the additive accounts for 13% of the mass of the calcium-free arsenic removal agent; the addition amount of the calcium-free arsenic removal agent is based on a pH value of all materials after the addition of 4.6; and the stirring reaction is performed at a stirring speed of 500 rpm for 55 min;
(2) the addition amount of the calcium hydroxide is based on a pH value of all materials after mixing of 10; and the secondary stirring reaction is performed at a temperature of 30±2° C. for 150 min; and (3) the subjacent concentrated slurry is taken as a pH value adjuster and introduced into the metallurgical arsenic-containing acidic waste liquid until a pH value of all materials is 1.7, and filtration is performed after stirring reaction for 35 min.

Example 8

The process is the same as that of Example 1, except that:
(1) the additive accounts for 14% of the mass of the calcium-free arsenic removal agent; the addition amount of the calcium-free arsenic removal agent is based on a pH value of all materials after the addition of 4.8; and the stirring reaction is performed at a stirring speed of 500 rpm for 55 min;
(2) the addition amount of the calcium hydroxide is based on a pH value of all materials after mixing of 9.5; and the secondary stirring reaction is performed at a temperature of 30±2° C. for 160 min; and
(3) the subjacent concentrated slurry is taken as a pH value adjuster and introduced into the metallurgical arsenic-containing acidic waste liquid until a pH value of all materials is 1.6, and filtration is performed after stirring reaction for 40 min.

What is claimed is:

1. A method for circularly purifying a metallurgical arsenic-containing acidic waste liquid and recovering sulfur, comprising the following steps:
   (1) purifying for removing arsenic by taking the metallurgical arsenic-containing acidic waste liquid as a first raw material; adding an amount of calcium-free arsenic removal agent into the first raw material for a stirring reaction to obtain a first reaction mixture, and then filtering the first reaction mixture to obtain an arsenic-containing slag and a purified liquid;
   wherein the calcium-free arsenic removal agent is a mixture of an additive and water, and the additive is one or more of oxides, hydroxides, or carbonates of potassium, zinc, iron, or magnesium; the amount of the calcium-free arsenic removal agent added into the first raw material is based on providing a pH value of 4-5 after addition; and
   the purified liquid is a sulfur-rich liquid, in the purified liquid, sulfate ions have a concentration of 70-90 g/L, and arsenic and iron are not detected;
   (2) purifying a return water by adding an amount of calcium hydroxide into the purified liquid for a secondary stirring reaction to obtain a second reaction mixture, and then performing sedimentation and separation on the second reaction mixture to obtain a supernatant and a subjacent concentrated slurry; refluxing the supernatant to a pretreatment workshop; wherein the calcium hydroxide is prepared by mixing CaO and water according to a solid-liquid ratio of 1:(2.5-3) g/L; and the amount of the calcium hydroxide added into the purified liquid is based on providing a pH value of 8-10.5 after addition;
   (3) recycling and recovering by taking the subjacent concentrated slurry as a pH value adjuster, introducing the subjacent concentrated slurry into the metallurgical arsenic-containing acidic waste liquid to obtain a resulting mixture, until a pH value of the resulting mixture reaches 1.5-1.8, performing a third stirring reaction for at least 30 min to obtain a third reaction mixture, and then filtering the third reaction mixture to obtain a liquid phase and a slag phase; and
   (4) washing the slag phase with water and taking a washed secondary slag phase as a gypsum product; refluxing a washing liquid obtained by the washing to the pretreatment workshop; and taking the liquid phase as a second raw material for the purifying for removing arsenic.

2. The method for circularly purifying the metallurgical arsenic-containing acidic waste liquid and recovering sulfur according to claim 1, wherein in the step (1), in the metallurgical arsenic-containing acidic waste liquid, arsenic has a concentration of 1.5-8.5 g/L, iron has a concentration of 20-35 g/L, sulfate radical has a concentration of 100-140 g/L, a molar ratio of iron to arsenic is greater than 3, and a pH value of the metallurgical arsenic-containing acidic waste liquid is less than 1.5.

3. The method for circularly purifying the metallurgical arsenic-containing acidic waste liquid and recovering sulfur according to claim 1, wherein in step (1), the additive accounts for 10-15% of a mass of the calcium-free arsenic removal agent.

4. The method for circularly purifying the metallurgical arsenic-containing acidic waste liquid and recovering sulfur according to claim 1, wherein in step (1), the stirring reaction is performed at a stirring speed of 400-600 rpm for 50-60 min.

5. The method for circularly purifying the metallurgical arsenic-containing acidic waste liquid and recovering sulfur according to claim 1, wherein in step (2), the secondary stirring reaction is performed at a temperature of 30±2° C. for at least 90 min.

6. The method for circularly purifying the metallurgical arsenic-containing acidic waste liquid and recovering sulfur according to claim 1, wherein in step (3), each a mass content of the arsenic and the iron in the slag phase is less than or equal to 0.1%.

7. The method for circularly purifying the metallurgical arsenic-containing acidic waste liquid and recovering sulfur according to claim 1, wherein in step (4), the washing is performed until the washing liquid is neutral.

* * * * *